US007931207B2

(12) United States Patent
Holmes et al.

(10) Patent No.: US 7,931,207 B2
(45) Date of Patent: Apr. 26, 2011

(54) OPTICALLY VARIABLE MAGNETIC STRIPE ASSEMBLY

(75) Inventors: Brian William Holmes, Hampshire (GB); Malcolm Robert Murray Knight, Hampshire (GB); David Allen Stone, Hampshire (GB)

(73) Assignee: De La Rue International Limited, Hampshire (GB)

( * ) Notice: Subject to any disclaimer, the term of this patent is extended or adjusted under 35 U.S.C. 154(b) by 0 days.

(21) Appl. No.: 11/989,946

(22) PCT Filed: Jan. 9, 2007

(86) PCT No.: PCT/GB2007/000045
§ 371 (c)(1), (2), (4) Date: Apr. 30, 2008

(87) PCT Pub. No.: WO2007/080389
PCT Pub. Date: Jul. 19, 2007

(65) Prior Publication Data

US 2008/0265040 A1 Oct. 30, 2008

(30) Foreign Application Priority Data

Jan. 9, 2006 (GB) .................................. 0600323.0

(51) Int. Cl.
*G06K 19/06* (2006.01)
*G06K 19/02* (2006.01)

(52) U.S. Cl. ....................................... 235/493; 235/488

(58) Field of Classification Search .................. 235/493, 235/487, 488, 492, 379, 380; 359/5, 1, 2, 359/15, 566, 569, 573, 576; 283/82, 86; 430/1, 2

See application file for complete search history.

(56) References Cited

U.S. PATENT DOCUMENTS 4,275,113 A * 6/1981 Saito et al. .................... 428/323
4,579,371 A * 4/1986 Long et al. ...................... 283/83
4,631,222 A 12/1986 Sander
4,684,795 A 8/1987 Colgate, Jr.
4,856,857 A 8/1989 Takeuchi et al.
5,044,707 A * 9/1991 Mallik ............................. 359/2
5,093,184 A 3/1992 Edwards
5,128,779 A * 7/1992 Mallik ............................. 359/2
5,145,212 A 9/1992 Mallik
5,383,687 A * 1/1995 Suess et al. ..................... 283/86
5,496,633 A * 3/1996 Steuerwald et al. .......... 428/841
5,720,500 A 2/1998 Okazaki et al.

(Continued)

FOREIGN PATENT DOCUMENTS

DE 39 32 505 A1 4/1991

(Continued)

OTHER PUBLICATIONS

English language translation of German Patent Publication No. DE 10 318 103 A filed Nov. 11, 2004.

(Continued)

*Primary Examiner* — Michael G Lee
*Assistant Examiner* — Suezu Ellis
(74) *Attorney, Agent, or Firm* — Oliff & Berridge, PLC

(57) ABSTRACT

An optically variable magnetic stripe assembly includes a magnetic layer, an optically variable effect generating layer over the magnetic layer, and a reflective layer between the magnetic layer and the optically variable effect generating layer. The reflective layer includes at least one metal portion.

24 Claims, 10 Drawing Sheets

U.S. PATENT DOCUMENTS

| | | | | |
|---|---|---|---|---|
| 6,343,745 | B1 * | 2/2002 | Bohm et al. | 235/493 |
| 6,903,850 | B2 * | 6/2005 | Kay et al. | 359/2 |
| 6,930,606 | B2 * | 8/2005 | Crane et al. | 340/572.1 |
| 6,987,590 | B2 * | 1/2006 | Phillips et al. | 359/2 |
| 7,677,462 | B2 * | 3/2010 | Hynes et al. | 235/492 |
| 2004/0161690 | A1 * | 8/2004 | Sakurai et al. | 430/124 |
| 2006/0152807 | A1 * | 7/2006 | Kaule | 359/566 |
| 2008/0265040 | A1 | 10/2008 | Holmes et al. | |

FOREIGN PATENT DOCUMENTS

| | | | |
|---|---|---|---|
| DE | 103 18 103 | A1 | 11/2004 |
| EP | 0 286 738 | A1 | 10/1988 |
| GB | 2 219 248 | A | 12/1989 |
| JP | A-03-175093 | | 7/1991 |
| JP | A-3-175093 | | 7/1991 |
| JP | A-3-248325 | | 11/1991 |
| JP | A-6-278390 | | 10/1994 |
| JP | A-2001-191690 | | 7/2001 |
| JP | A-2001-216632 | | 8/2001 |
| JP | A-2001-322393 | | 11/2001 |
| JP | A-2002-042319 | | 2/2002 |
| JP | A-2002-288818 | | 10/2002 |
| WO | WO 99/04983 | A1 | 2/1999 |
| WO | WO 01/07268 | A1 | 2/2001 |
| WO | WO 03106189 | A1 * | 12/2003 |
| WO | WO 2005/120855 | A1 | 12/2005 |

OTHER PUBLICATIONS

Reference citing: http://www.salp.co.jp/products/resin/resin_data.html. Sep. 15, 2010.

Dictionary of Electro-Mechanics Technology, English-language Dictionary. Aug. 1, 1996.

Dec. 21, 2010 Office Action issued in U.S. Appl. No. 12/068,215.

Reference citing: http://www.salp.co.jp/products/resin/resin_data.html. Sep. 15, 2010.

Dictionary of Electro-Mechanics Technology, English-language Dictionary. Aug. 1, 1996.

* cited by examiner

OPTICALLY VARIABLE MAGNETIC STRIPE ASSEMBLY

The current invention is concerned with magnetic data stripes, and in particular optically variable magnetic stripe assemblies, such as those found on financial transaction cards.

It has been conventional practice now for many years, to provide a magnetic stripe on payment and identity documents such as credit cards, debit cards, cheque cards, transport tickets, savings books and other forms of security documents. The presence of the magnetic stripe allows such documents to become carriers of non-visual machine readable data.

In many instances such documents have also been provided with a visual security or authentication device in the form of an embossed hologram or diffractive image. However the presence of both such devices on such documents significantly reduces the remaining surface area of document available to carry other information, security features and design elements.

There has therefore been a drive to combine the two devices in one integrated structure, which we refer to henceforth as an optically variable-magnetic (OVM) stripe. The resultant device may be regarded as either a visually secured magnetic data carrier or alternatively a Ahologram@ which can be personalised with machine readable data (and read in an open architecture environment).

Prior art constructions for OVM stripes have been detailed U.S. Pat. No. 4,684,795, U.S. Pat. No. 4,631,222, U.S. Pat. No. 5,383,687 and EP-A-0998396. In principle the OVM stripe can substitute for all applications where currently high and low coercivity tape is currently applied, the most significant application by value is that in which the OVM stripe is applied to plastic financial transaction cards.

FIG. 1 is a cross-sectional schematic of a conventional prior art OVM stripe applied to a financial card as described in the prior art cited above.

Essentially it comprises 2 functional sub-structures:

1. A transparent lacquer layer 1 embossed with an holographic or diffractive surface relief structure 2 and coated with a continuous reflection-enhancing layer of metal 3, typically aluminium, bonded by an adhesion promoting primer layer 4 to 2. A magnetic layer 5 that is coated on the primer layer 4. The magnetic layer 5 is further coated with a heat activated adhesive layer 6 to bond the structure to the card substrate 7.

The plastic transaction card 7 is typically a tri-laminate structure (not shown) comprising an opaque central polymeric core layer printed with information on either side, laminated between 2 transparent polymeric overlay sheets.

The OVM stripe is first applied to that transparent overlay sheet pertaining to the rear of the card, by a heat activated continuous roll-on transfer process. Subsequent to this the three laminate layers are then fuse bonded together in a laminating press. In order to apply the magnetic tape to the transparent overlay sheet, through in essence a hot-stamping process, it is first necessary to provide the OVM stripe structure onto a release coated carrier or backing layer.

However a structural drawback of the prior art OVM stripe has been identified. Unlike conventional non-holographic magnetic stripes the prior art OVM stripes are provided with a continuous metallic reflection enhancing layer 3. This metallic reflection enhancing layer is conductive and this has led to problems with static discharges in automatic teller machines.

It is well known that under conditions of low environmental humidity, substantial electrostatic surface charges can build up on articles or bodies which are poor conductors or conversely good insulators. For example a person walking around in a carpeted room wearing shoes with insulating (e.g. rubber) soles, can acquire a very significant amount of electrostatic surface charge this will become evident when that person touches a good conductor such a metal door handle, thus effecting rapid discharge of this electrostatic charge and experienced as a minor electric shock.

In particular as the air humidity drops below 25% the conductivity of the air becomes low enough to prevent any leakage of electrostatic charge into the atmosphere in such circumstances electrostatic potentials in excess of several kilovolts can build up on the human body.

Consider next a plastic, typically PVC, transaction card containing a conventional magnetic stripe.

PVC when compared to the human body is a very good insulator, hence we should expect, in absence of a conductive element within the card making contact with a second conductor external to the card, that there will be a distribution of electrostatic charge on the surface of the card.

Now the magnetic oxide layer within the known non-holographic magnetic stripe is currently exposed at either edge of the card and hence there exists the potential that when the card is inserted into an automated transaction machine (ATM) or magnetic card reader the exposed edge may contact a conductive component within the reader and rapidly discharge the electrostatic build-up on the surface of the card into the electrical circuitry of the ATM or reader. The associated voltage spike may be sufficiently large to damage or deactivate the machine. However tests conducted by the inventors have confirmed that the conductivity of the magnetic oxide layer is poor resulting at worst in a very slow transfer or discharge of the electrostatic potential built up on the card.

However moving our consideration of this electrostatic discharge problem on from the scenario of using a card containing a standard magnetic stripe to that where the card contains an OVM stripe, we now have the opportunity for conduction and thus electrostatic discharge through the reflective metal layer 3 applied to the surface relief 2 present on the holographic diffractive layer. Tests conducted by the inventors, wherein the exposed edge of the OVM stripe (present on a PVC transaction card) is brought into contact with a metal sphere connected to a device capable of measuring the transit dynamic changes in the charge or voltage transferred to the metal sphere confirm that the reflective metal layer very rapidly and efficiently discharges the electrostatic charge that had resided on the exterior of the card onto the metal sphere.

Furthermore such tests also confirm that if an individual holds the card in such a way that one finger contacts the near edge of the OVM stripe, whilst the other end of the OVM stripe is allowed to touch the conducting sphere then whatever electrostatic charge and potential is present on the individual will also be rapidly discharged onto the conducting sphere.

Clearly since the electrostatic build up on an individual under the right environmental conditions can be very considerable, there is therefore a significant risk that when a transaction card is located into an ATM or reader in the manner described (causing discharge of the electrostatic present on card and card holder into the circuitry of the machine) the machine may be damaged or its operation disrupted.

In accordance with a first aspect of the present invention, an optically variable magnetic stripe assembly includes a magnetic layer, an optically variable effect generating layer over the magnetic layer, and an electrically non-conductive reflective layer between the magnetic layer and the optically variable effect generating layer.

The inventors recognised that a modified OVM stripe structure was required in order to eliminate risk in the field that cards containing an OVM stripe may cause operational problems associated with electrostatic discharge through the metal layer and in particular end to end discharge electrically linking the body of the card holder to conductive elements in the transaction device or reader.

In the first aspect of the invention, we replace the metal reflecting layer of the prior art with an electrically non-conductive reflective layer. This then reduces or avoids the problem of electrical discharge when the edge of a security document provided with the magnetic stripe assembly is touched.

The non-conductive reflective layer can be fabricated in a number of ways by, for example, using a non-metallic material such as a high refractive index material.

In accordance with a second aspect of the present invention, an optically variable magnetic stripe assembly includes a magnetic layer, an optically variable effect generating layer over the magnetic layer, and a reflective layer between the magnetic layer and the optically variable effect generating layer, the reflective layer comprising at least one metal portion, the or each metal portion only partially extending along the full length of the optically variable effect generating layer.

In this aspect, a metal reflective layer can be used but in the form of at least one metal portion and by ensuring there is no electrically conductive path along the full length of the optically variable effect generating layer. This could be achieved by providing a number of metal portions with discrete breaks between them or by ensuring that the metal portion does not extend to the edges of the assembly.

In accordance with a third aspect of the present invention, an optically variable magnetic stripe assembly includes a magnetic layer, an optically variable effect generating layer over the magnetic layer, a discontinuous metal reflective layer between the metal layer and the optically variable effect generating layer, and a static resistive layer positioned to enable a static charge to be dissipated in a controlled manner.

The static resistive layer may contact the metal reflective layer but this is not essential. The metal layer can be discontinuous by incorporating discrete breaks between metal portions or by using a dot demet structure.

In this approach, a static resistive layer (or high resistance) layer allows charge slowly to be dissipated in a controlled manner. Such a static resistive layer needs to have a surface resistivity in the range 10e6-10e10 ohms/square but especially 10e8-10e9 ohms/square. Suitable static resistive layers comprise a combination of a electroconductive pigment in a non-conducting binder. Examples of suitable conductive pigments include Carbon black and Antimony Oxide. VMCH is an example of a suitable binder. (VMCH is a commonly used binder/adhesive available from a number of sources e.g. http://www.dow.com/svr/prod/cmvc.htm).

The magnetic stripe assembly can be used with a variety of security articles including security documents as will be readily apparent to a person of ordinary skill in the art.

Some examples of optically variable magnetic stripe assemblies according to the invention will now be described and contrasted with an example with reference to the accompany drawings, in which.

In the following description, those layers which are substantially the same as layers described earlier will be given the same reference numerals.

EXAMPLE 1

Figure 1:
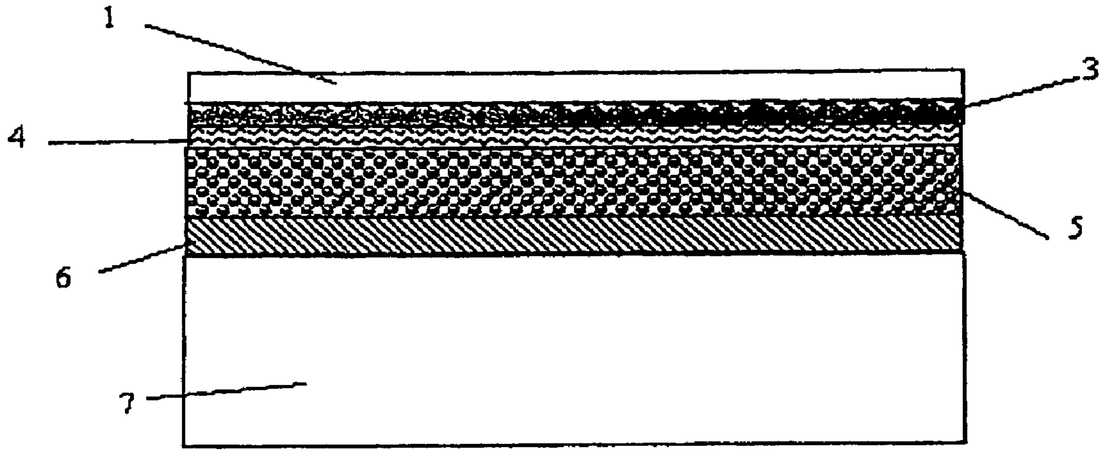
Figure 1 Prior Art
FIG. 1 is a schematic cross-section (not to scale) through a conventional assembly adhered to a card substrate.
Figure 2:
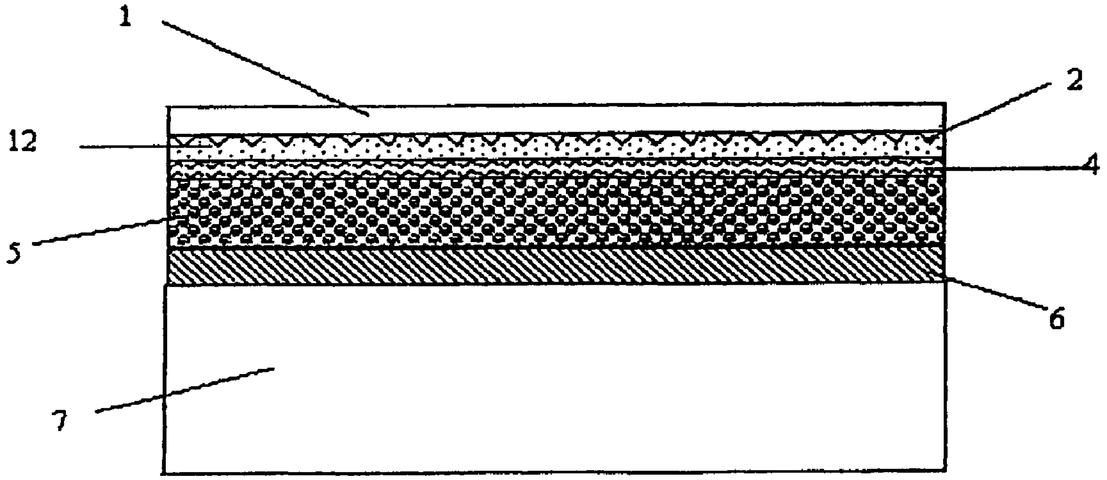
FIG. 2 is a view similar to FIG. 1 but of a first example of the invention.
Figure 3:
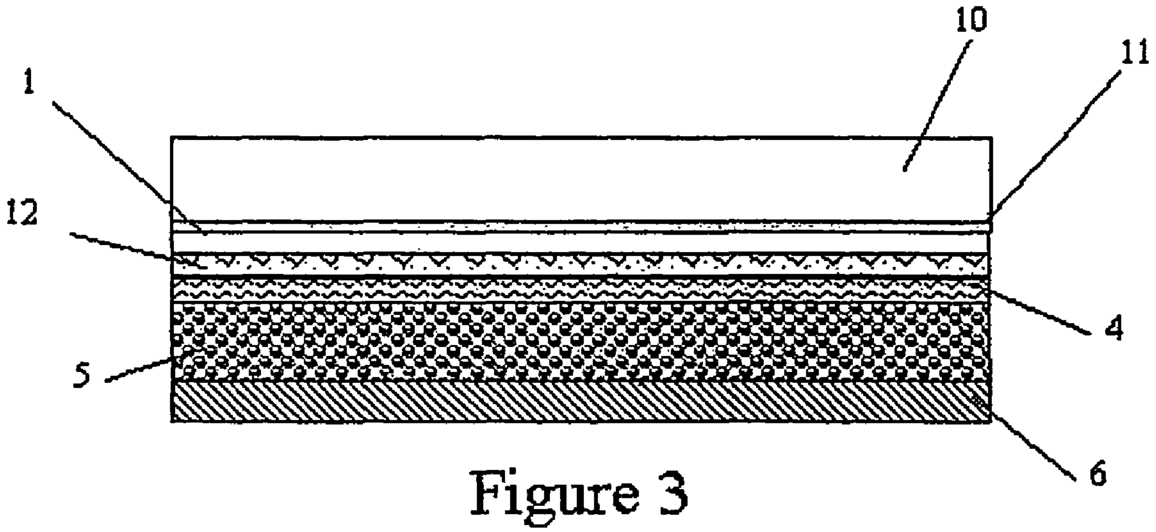
FIG. 3 illustrates in cross-section (not to scale) the assembly of FIG. 2 supported on a carrier layer and prior to mounting to the card substrate.

FIGS. 2 and 3 show a cross sectional illustration of the first solution. FIG. 2 shows the construction after application to a card substrate 7. FIG. 3 shows the construction prior to application to a card substrate. FIG. 3 shows the presence of a supporting polymeric carrier layer 10 and a release layer 11. Typically the carrier layer 10 is a 19-23 micron PET layer and the release layer 11 is typically a wax or silicone layer between 0.01 and 0.1 microns in thickness. Here the highly conductive metal reflection-enhancing layer 3 of the prior art has been replaced with a non-conducting reflection enhancing layer. A first example of a suitable alternate reflection-enhancing layer is a coating 12 of a material which has an optical index of refraction of at least 2.0 and in electrical terms is such a poor conductor that it may be classified as an insulator (in electromagnetic theory known as a dielectric).

An index of refraction of 2.0 or more is usually necessary to ensure that there is a minimum refractive index change of 0.5 or more between the embossed lacquer layer 1 which typically has a index of refraction of around 1.4 and the dielectric reflection coating 12. The skilled practitioner will know both from experience and the application of Fresnel equation for reflection efficiency that this refractive index step will provide a holographic or diffractive image of acceptable visual brightness under most ambient lighting conditions.

Suitable dielectric materials with a refractive index ∃2.0, with good optical transparency and amenable to coating by the processes of vacuum deposition are TiO2, ZnS & $ZrO_2$—though there a number of other suitable metal oxide materials.

Such materials are known within the optical coatings industry as high refractive index (HRI) materials.

These materials are deposited to create the layer 12 with a thickness range between 0.07 micrometers and 0.15 micrometers, depending on the particular dielectric chosen and the optical effect required.

Note that because these HRI coatings are transparent the holographic image will be viewed against the reflective hue provided by the underlying coatings. Surprisingly, the inventors found that this was not necessarily a disadvantage despite the fact that a fully obscuring metal layer had been used in the past.

In fact, it can be advantageous. For example, coloured magnetic materials exist for which it is a benefit to be able to view through the high refractive index layer. It makes the assembly much more difficult to copy because colours or indicia can be provided on the magnetic layer.

The use of a high refractive index layer also avoids problems associated with metallic layers such as corrosion.

For the case in which adhesion promoting layer or primer 4 has no colorants present and has reasonable optical transparency then the background hue will be provided by the black (Hi-Co) or brown (Lo-Co) magnetic oxide layers. These dark colours will naturally have the desirable effect of increasing the perceived brightness and contrast of the holographic image. Should it be desirable that the underlying coatings not be visible through the HRI layer 12 for aesthetic reasons a further optical obscuring layer such as a coloured or metallic ink coated layer (not shown) can be provided between the HRI and magnetic layers. Metallic ink may be used so long as it is non-conducting. Indeed the majority of metallic inks are non-conducting as a non-conducting resin binder wholly surrounds the metal pigment particles. As a further enhancement this additional coated layer may be provided in the form of a single or multicolour design defining visibly readable information.

Rather than providing an additional layer similar effects could also be achieved by adding colorants to the primer 4 and/or adhesive layers 6.

The primer layer 4 may be a purely organic layer (possibly cross-linked) with a thickness of about 0.7 microns. Inorganic materials are also suitable. One particular example is described in U.S. Pat. No. 5,383,687 in which the layer is a layer of at least one organic polymer to which at least inorganic pigment is added. The polymers used may be for example high-molecular acrylic resins, polyvinylidene chloride PVC, PVC-copolymers, chlorinated rubber, polyester, and silicone-modified binder. The inorganic pigments used may be for example silicates and/or titanium dioxide.

It should be recognised that although we have shown the adhesion promoting primer layer 4 as single layer or coating we anticipate that this layer system may in effect be comprised of sub-layers or coatings, each with a separate and distinct formulation optimised for adherence to the reflection layer and magnetic layer respectively.

In such cases it may be preferable to provide the colorant (which may take the form of an organic dye or inorganic pigment) in only one of these sub-layers.

The inventors also recognised that in addition or as an alternative to modifying the hue or colour of the OVM stripe it may be also be advantageous to provide a luminescent material. Such materials are widely used within security printing to add additional security and can be verified using non-visible light sources.

As a further alternate to using a HRI layer 12 other non-conducting reflection-enhancing layers may be used. For example acceptable effects can be achieved using a non-conductive metallic ink instead of the HRI. This differs from the example above where a metallic ink is used in combination with a HRI layer.

EXAMPLE 2

Figure 4:
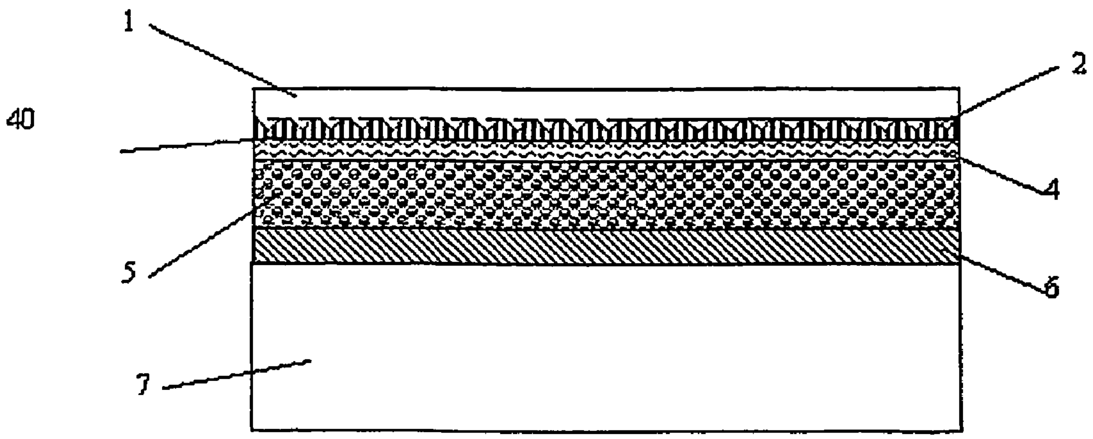
FIGS. 4 and 5 are views similar to FIGS. 2 and 3 respectively but of a second example.
Figure 5:
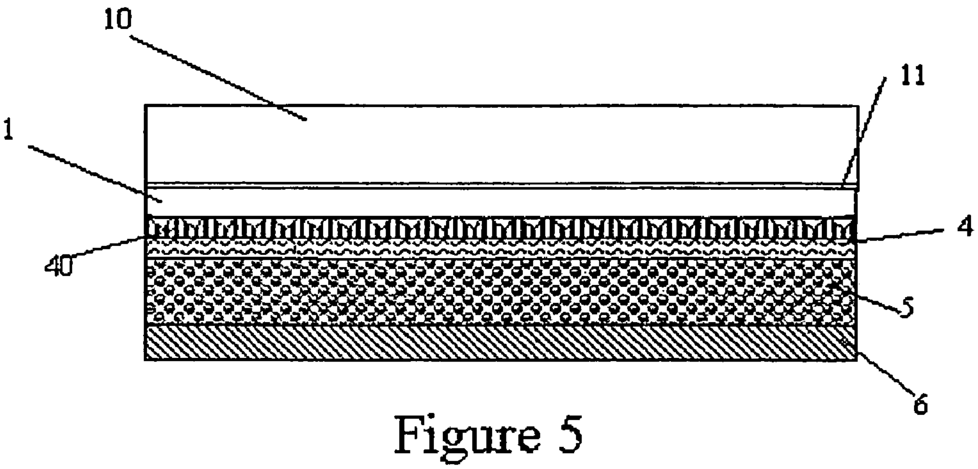
Figure 6:
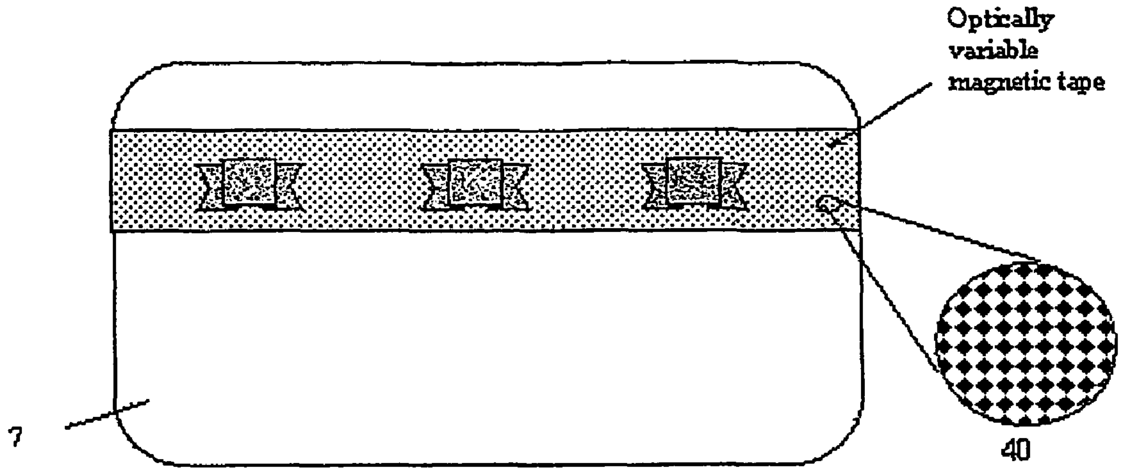
FIG. 6 is a plan view of the FIG. 4 example.

FIGS. 4, 5 and 6 illustrate a second example. Here the continuous metal layer of the prior art constructions has been replaced with a uniformly discontinuous metal layer 40 specifically a screen de-metallised reflective metal layer, wherein the metal is rendered into a regular matrix of dots or cells (circa 50-150 micrometers in diameter). This demetallisation can be effected in a number of ways which are well known in the art, see for example U.S. Pat. No. 5,145,212.

The preferred method would be to gravure print a water soluble pigmented mask (which is the negative of the desired metal cell screen pattern) onto the embossed layer 1, prior to metallisation. Following metallization the foil is immersed in de-ionised water to dissolve away the underlying mask and the associated metal waste matrix.

The advantage of this non-etchant approach is that it can be generically applied to all metal types. There is also no spatially discontinuous resist mask located along the stripe which may interfere with the magnetic encoding and reading process.

The percentage of metal retained in the cell matrix will depend on the visual effect required however there will be a technical requirement that adjacent metal cells or pixels do not touch thus restoring a conductive path.

FIGS. 4 and 5 show schematic cross sections of a card construction with the continuous metal layer replaced with the partially demetallised dot screen structure described above.

FIG. 6 shows a plan view of the construction described above with an enlarged view of the dot demetallised screen cell structure. As mentioned above the density of the dot screen can be varied dependent upon the visual effect desired. A higher density of metal left after demetallisation will give the impression of a continuous metal layer to the human eye whereas a lower metal density will result in an OVM stripe that appears semi-transparent.

As for Example 1 additional print or coating layers can optionally be provided under the dot screen.

The use of a regular dot screen is described here. It should be noted that irregular or stochastic dot screens could be used. Also rather than dots the screen elements could comprise indicia or logos as this would add a further level of security.

EXAMPLE 3

In the third example, a discontinuous metal reflection enhancing layer 30 is provided.

Figure 7:
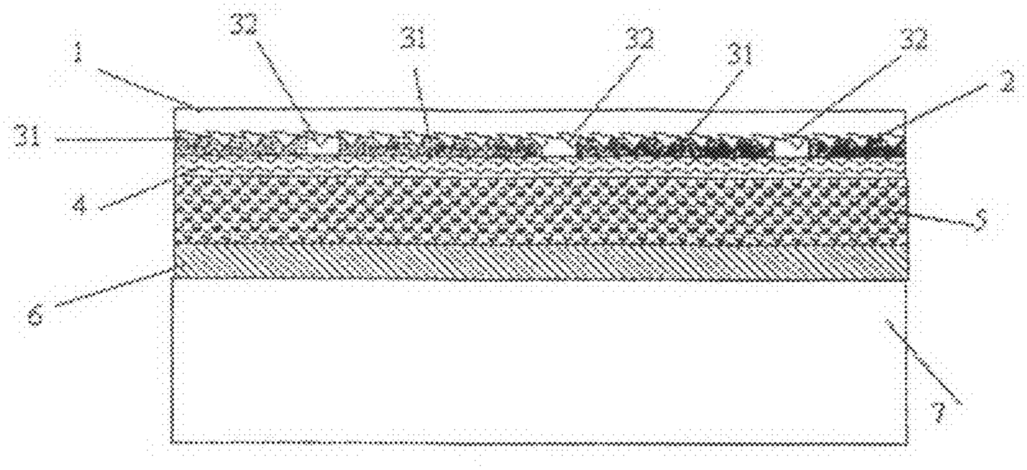
FIG. 7 is a view similar to FIG. 2 but of a third example of an assembly according to the invention mounted on a card substrate.
Figure 8:
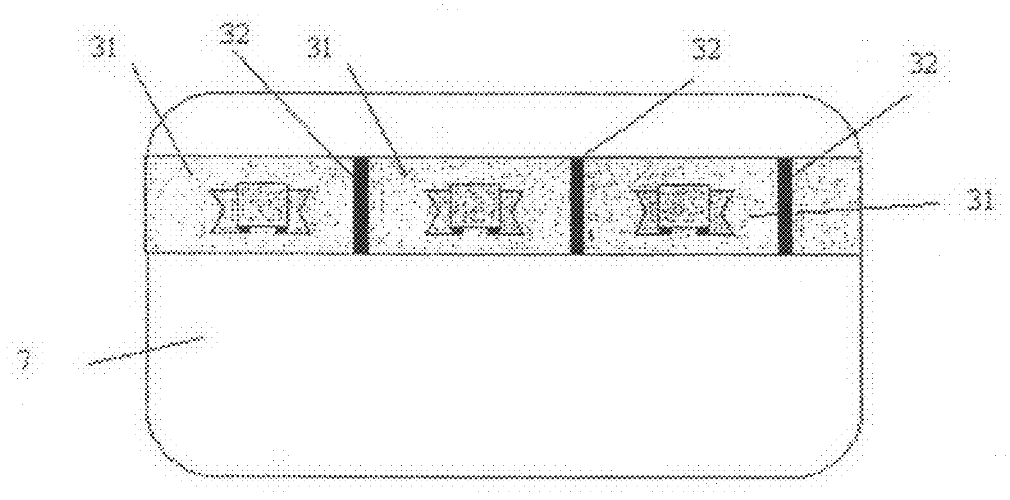
FIG. 8 is a plan view of the assembly shown in FIG. 7.

In a first embodiment of this Example, illustrated in FIGS. 7 and 8, the metal reflection-enhancing layer 30 is formed by a number of metal portions 31 separated by discrete metal free regions or gaps 32. These demetallised metal free regions 32 extend across the full width of the OVM stripe providing a break in the conductive path. The metal free regions 32 are provided by a demetallisation process such as the one described above for the comparative example. It is preferred that the metal free regions 32 present in the reflection enhancing layer 30 should have gap widths totalling 9 to 10 mm. However, gap widths totalling 5 to 15 mm or more are envisaged. The use of smaller gaps is possible but there is an increased risk of any electrostatic discharge bridging the gap. It should be noted that it is the total of the gap widths present rather than the width of a single gap which is important. For example the OVM stripe shown in FIGS. 7 and 8 has a total of 3 gaps 32. In this instance it would be preferred that each gap 32 has a width of 2-4 mm, thus the total gaps width present will be 6-12 mm. If the OVM were to only have two gaps 32 then each gap would need to be 3-10 mm, more preferably 4-6 mm. The size of the gap is a compromise between reducing the risk of an electrostatic discharge bridging the gap and aesthetic appearance.

Where a metal free region 32 is present it will be possible to view the primer layer 4 and, if the primer layer 4 is transparent, the dark magnetic layer 5. As for Example 1 these dark colours will have the desirable effect of increasing the perceived brightness and contrast of the holographic image. Should it be desirable that the underlying coatings not be visible for aesthetic reasons a further optical obscuring layer such as a coloured or metallic ink coated layer may be provided or the primer/magnetic layer pigmented with suitable coloured materials.

As a further alternative and means to retain the visibility of the holographic image in the non-metallised regions of the OVM stripe an additional HRI layer may be applied (not shown). The HRI layer is applied over the whole surface of the OVM stripe and can be applied either on top or underneath the metal reflection enhancing layer 31. For aesthetic purposes when using the combination of both metal and HRI reflection enhancing layer it is preferred not to have sharp break between the metal 31 and non-metal 32 areas. For example referring to FIG. 8 the metal and non-metal region are separated by a distinct break 32. In this instance it would be preferred if rather than being a distinct break the metal appeared to transition into the HRI area. This can be achieved in a number of ways.

By using a graduated screen going from 100% metal to 0% metal over a given area.

By using fine line design work at the edges of the metal area.

The fine line design work may also incorporate microtext or other graphical elements.

These possibilities are described in more detail below.

However the transition is achieved it is important to still retain a non-metal gap of suitable dimensions extending across the full width of the OVM stripe to provide a non-conducting path.

EXAMPLE 4

FIGS. 9, 10, 11 and 12 schematically illustrate a fourth example. In an approach similar to that described for Example 3 the continuous metal layer of the prior art is again formed by metal portions 31 with breaks 32 between them. However in this solution the breaks 32 are not wholly metal free rather they contain a demetallised dot screen 33 similar to that described above.

Figure 9:
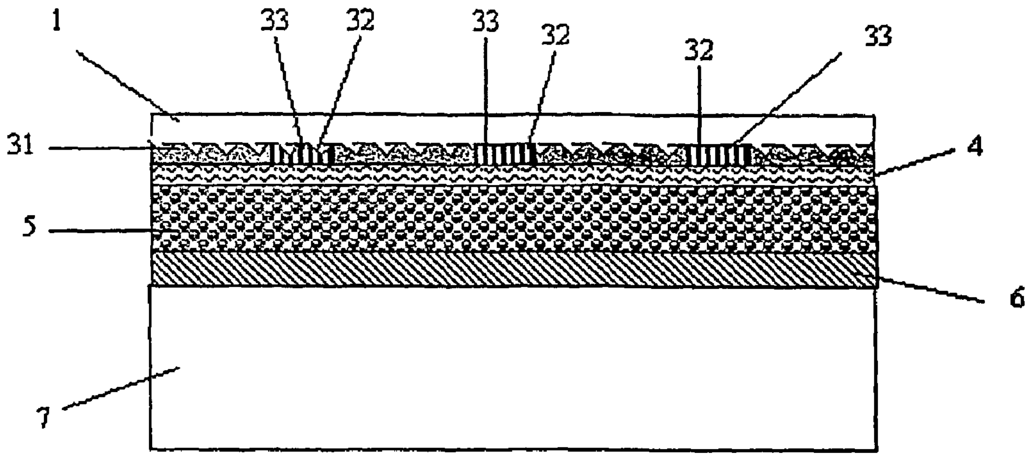
FIGS. 9 and 10 are views similar to FIGS. 2 and 3 respectively but of a fourth example of an assembly.
Figure 10:
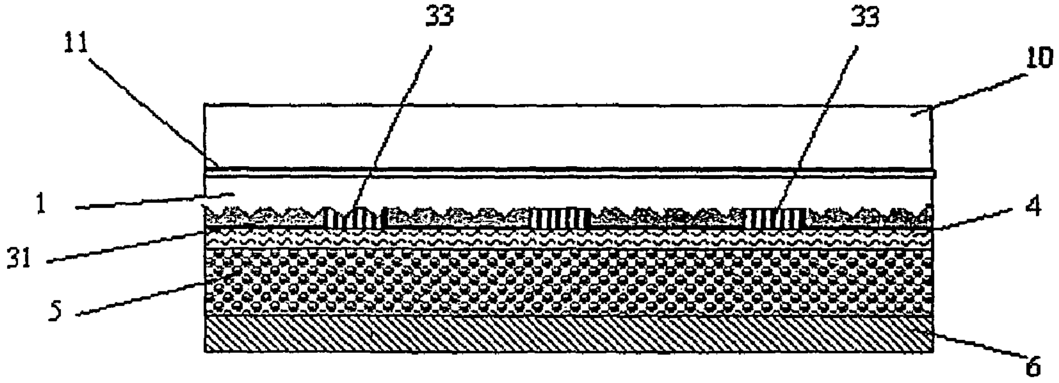

In FIGS. 9 and 10, it can be clearly seen that the metal reflection enhancing layer has been provided with partially demetallised regions 33. These partially demetallised regions comprising a dot screen. The dot screen can be produced in the same manner as that described in Example 2 except that the water soluble pigment mask is only applied in selected regions. Typically, the density of the dot screen gradually increases towards the metal portions 31.

Figure 11:
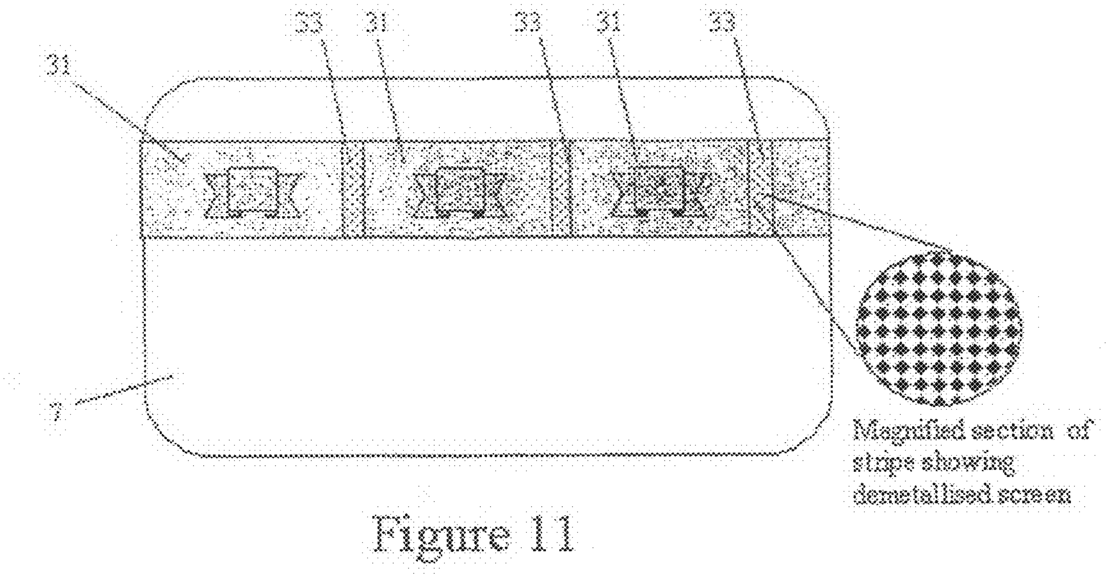
FIGS. 11 and 12 are plan views of different embodiments of the example shown in FIGS. 9 and 10.
Figure 12:
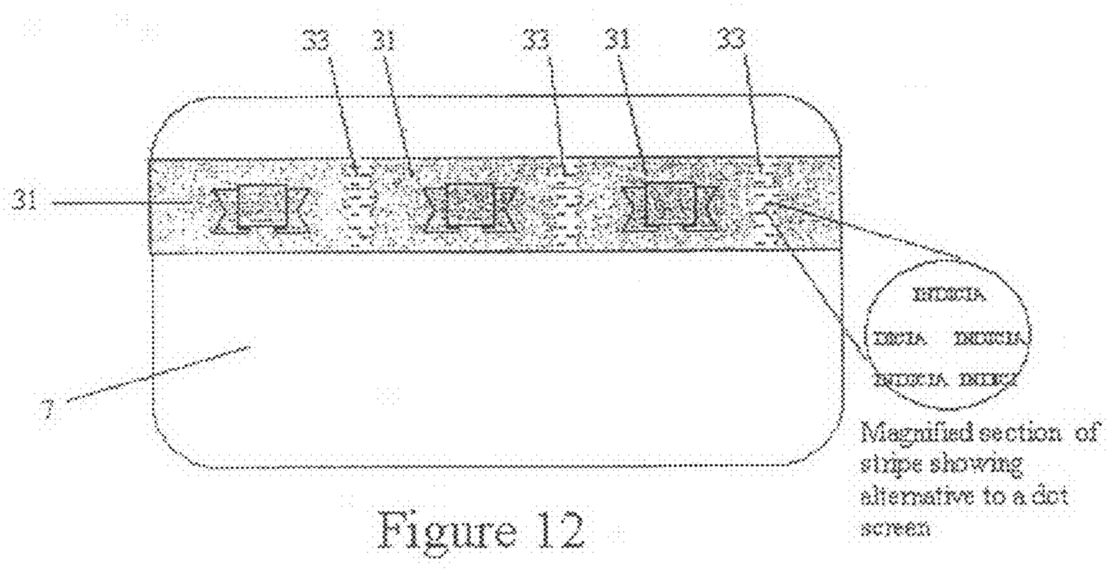

FIGS. 11 and 12 show illustrative plan views with magnifications of the demetallised screen regions of the OVM stripe construction. As can be seen from FIGS. 11 and 12 the partially demetallised screen regions 33 extend across the full width of the OVM stripe providing a break in the conductive path. As for Example 3 the dot demetallised breaks should comprises a gap of between 0.5 and 5 mm, preferably 0.1 and 0.4 mm more preferably 0.2 and 0.3 mm. Though it is possible to provide wider gaps than those mentioned above it is not advisable to provided narrower gaps as the static charge can jump across the gap.

The demetallised screen region 33 of FIG. 11 has been provided as a structure comprising a series of metal dots. Each of the metal dots is such that it does not contact any other surrounding metal dots to ensure no conductive path is provided. As described above, the density of the metal dots will effect the appearance of the demetallised regions.

FIG. 12 shows an alternative arrangement where rather than a regular dot screen, different demetallisation pattern has been used. In this example the word NDICIA has been demetallised as positive script. This provides both a break in the conductive path and an additional security feature. The letters forming the word NDICIA are so small as to not be visible by the human eye and can only be viewed under magnification.

It will apparent to someone skilled in the art that the use of text is merely a design choice and any indicia, line design, logo or image can be used so long as a break in the conductive path is provided across the full width of the OVM stripe. In particular it should be noted that both positive (metal on a non-metal background) and negative (non-metal on a metal background) representations of information may be used.

EXAMPLE 5

Figure 13:
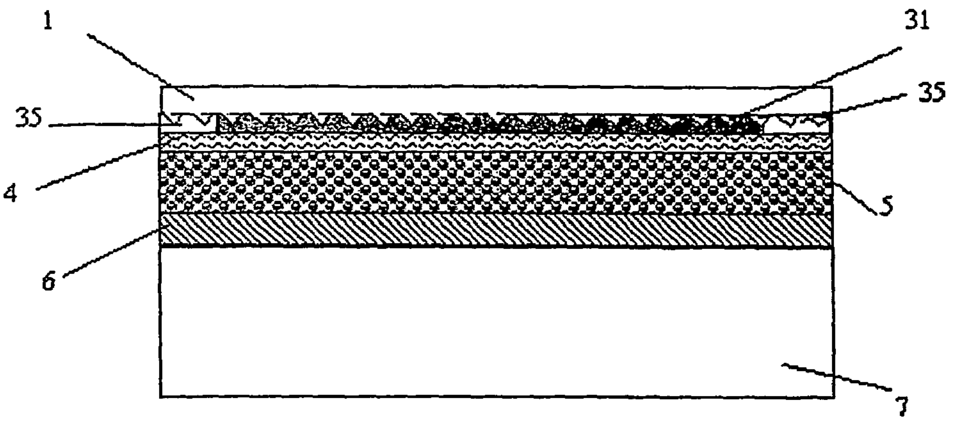
FIG. 13 is a view similar to FIG. 2 but of a fifth example of an assembly according to the invention.

FIG. 13 illustrates a further solution to the problem described above. In essence the construction is the same as that described in Example 3 in that breaks are provided in the conductive path of the metal reflection enhancing layer. However here the breaks 35 in conductivity are placed at the edges of the card.

As with the previous solutions the non-conducting breaks 35 present at the edges of the final finished card should comprise regions totalling 5 to 15 mm or more, preferably 9-10 mm. Though it is possible to provide wider regions than those mentioned above it is not advisable to provided narrower regions as the static charge can jump across the gap. However it should be noted that due to the need to effectively provide two breaks immediately next to each other and sufficient space for the die-cutting and matrix stripping operations the actual non-conducting break regions on the foil prior to application to a card will be much greater than the dimensions cited above.

By having the non-conductive regions 35 at the edge of the card the metal conductive area 31 is in effect sealed and cannot be contacted directly. Thus the metallic region 31 is not in direct contact with either the person presenting the card or any metal components on the ATM apparatus accepting the card.

Figure 14:
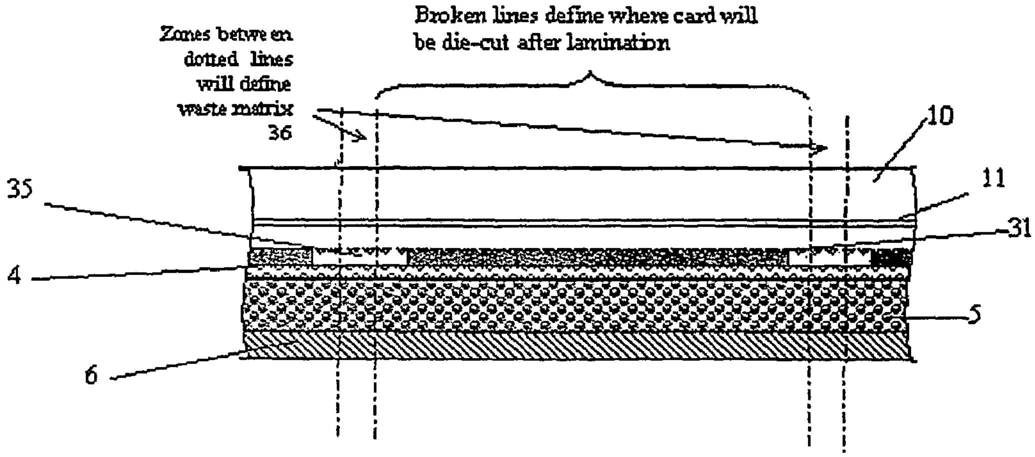
FIG. 14 is a view similar to FIG. 3 of the fifth example.

This construction requires the stripe to be applied to the card in register. FIG. 13 shows a schematic cross section of the OVM stripe construction with the non-conducting breaks provided at the edges of the card. FIG. 14 illustrates the same construction prior to application on to card and including the areas 36 between adjacent cards which are die cut and removed during manufacture.

In this instance the non-conducting breaks 35 may be provided by a demetallised non-metal region or a demetallised screen structure such as those described above. As with the previous examples the non-metal or partially demetallised regions can optionally be provided with additional coloured or metallic inks layers to prevent viewing of the primer and dark magnetic layers.

Likewise rather than provide an additional coloured layer the primer and/or magnetic layer can be coloured using pigments or dyes.

EXAMPLE 6

Figure 15:
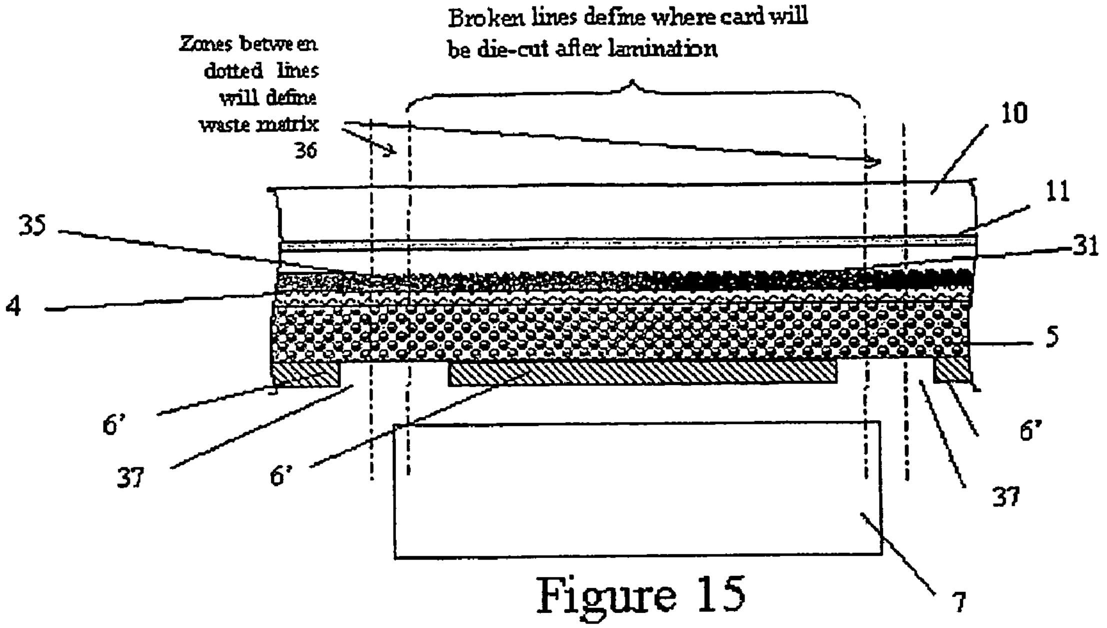
FIG. 15 is a view similar to FIG. 14 but of a sixth example of a stripe assembly according to the invention.

FIG. 15 illustrates another approach to overcome problems associated with static discharge of magnetic stripe cards having a conductive metal layer within their construction.

Within this solution rather than provide breaks in the metal reflection enhancing layer the adhesive layer 6' is applied in a selective manner. When the OVM stripe illustrated in FIG. 15 is applied on to a card only those regions of the stripe having adhesive associated with them will transfer on to the card. The size of the non-adhesive coated regions 37 after die cutting and in the finished card should be of the same order as those described for the non-conducting breaks i.e. regions having widths totalling 5 to 15 mm or more, preferably 9-10 mm. The result is that discrete, metal free regions will be formed at the edges of the assembly corresponding to the adhesive free regions 37. The end product, after transfer, is thus similar to FIG. 13.

FIG. 15 shows the non-adhesive areas 37 at the edges of the card, though it should be appreciated that the non-adhesive regions could be provided anywhere along the length of the OVM stripe. Also it should be appreciated that the adhesive could be applied in a dot pattern either locally or across the full surface of the stripe. Note that it is possible to locate breaks in the metal layer such that they are superposed and in register with the breaks in the adhesive layer.

It should also be noted that the selectively coating of an adhesive can be used in conjunction with any of the solutions already described herein. In particular the use of a selectively applied adhesive would be advantageous in combination with Example 4.

EXAMPLE 7

Figure 16:
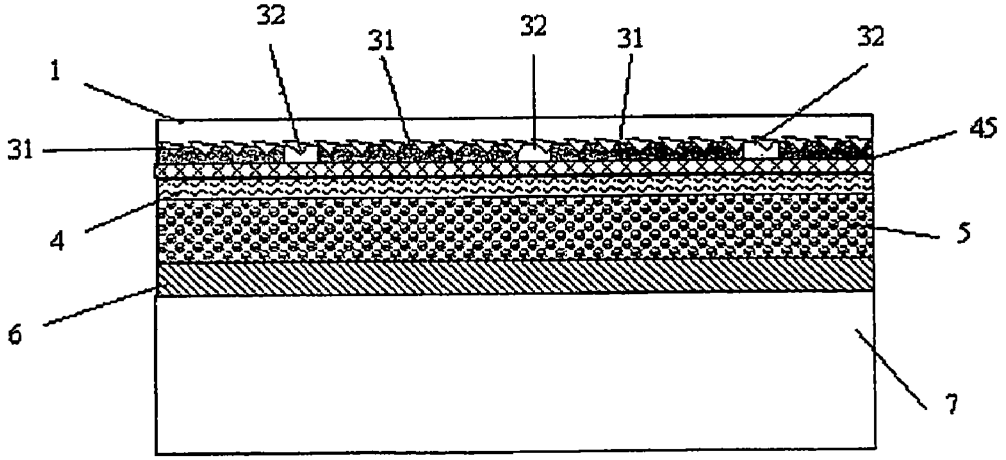
FIG. 16 is a view similar to FIG. 2 but of a seventh example of a stripe assembly according to the invention mounted on a card substrate; and, FIGS. 17 and 18 are a schematic cross-section and a plan view respectively illustrating the use of two different metals for the metal enhancing reflective layer.

In this instance a discontinuous metal layer 31 is used in conjunction with a further static resistive (or high resistance) layer 45 (FIG. 16). A discontinuous metal layer must be used as any electrostatic discharge will always take the path of least resistance. If a continuous metal layer is present the electrostatic discharge will merely bypass the static resistive layer. The layer 45 is provided under and in contact with the metal layer 31 and provides a means by which static charge can be dissipated in a controlled manner. Any charge build up in the card is discharged in a slow and more controlled manner by the discharging layer 45.

A static resistive layer is a layer with a surface resistivity in the range 10e6-10e10 ohms/square but especially 10e8-10e9 ohms/square. Suitable static resistive layers comprise a combination of an electroconductive pigment in a non-conducting binder. Examples of suitable conductive pigments include Carbon black and Antimony Oxide (e.g. Stanosat CPM10C nanodispersion grade available from Keeling and Walkers). VMCH is an example of a suitable binder. (VMCH is a commonly used binder/adhesive available from a number of sources e.g. http://www.dow.com/svr/prod/cmvc.htm). Experimental work has shown that the static resistive layer should be applied with a coat weight of between 0.5 and 2 gsm.

It has been found that when using carbon black it is difficult to control the surface resitivity by altering the loading of carbon black in binder. For example a ratio of 0.3:1 carbon black to binder in the dry coated film gives a surface resitivity of approximately 10e7 Ohms/square whereas a ratio of 0.25:1 gives a surface resitivity of 10e11 Ohms/square (effectively insulating). Thus for a relatively nominal change in ratio there is a much more significant change in surface resitivity. This can present problems as a greater level of control is preferred. This lack of control can be overcome by coating the carbon black static resistive material in a non-all over manner. That is rather print the material as a solid block is printed as a series of thin parallel tracks extending parallel to the long edge of the OVM stripe. By reducing the amount of static resitive material present the surface resitivity can be increased as you are in effect reducing the area of conductive path across the gap between the two metal areas.

When using Antimony Oxide it is possible to have much greater control over the surface resitivity by altering the ratio of Antimony Oxide to binder. Our experiments have shown that a ratio of 1.6:1 Antimony Oxide to binder in the dry coated film gives a surface resitivity of approximately 10e7 Ohms/square. A ratio of 1:1 gives a surface resitivity of 10e11 Ohms/square. As a further example a ration of 1.3:1 gives a surface resitivity of 10e8 Ohms/square.

Work undertaken has shown that in order to eliminate electrostatic discharge effects for input voltages of up to 15 kV the end to end resistance of the card, or more precisely the OVM stripe, needs to be between 10e6 to 10e9 ohms, typically in the region of 5×10E8 ohms). For an example OVM stripe having a static resistive layer in contact with a metal layer and the metal layer having either 2×5 mm gaps or 3×3.3.mm gaps the end to end resistance is the total resistance of the gaps i.e. approximately 10 mm in total for this example. In this instance the end to end resistance approximates to the surface resistivity of the static resistive layer so and end to end resistance of 5×10e9 Ohms would require a static resistive layer to have a surface resistivity of 5×10e9 Ohms/square.

In an alternative situation the static resistive layer is not in direct contact with the metal layer. It has been found that for the size of input voltage typically encountered the presence of one or more binder or materials layers between the static resistive layer and the metal layer has little effect. The input voltage being so great as to effectively short through the binder layer. Here a continuous static resistive layer is provided either below the binder layer or actually as part of the optically variable layer. In this scenario the end to end to end resistance needs to equal ten times the surface resistivity. Therefore for an end to end resistance requirement of 5×10e9 ohms the surface resistivity of static resistive layer needs to equal 5×10e8 Ohms/square.

Figure 17:
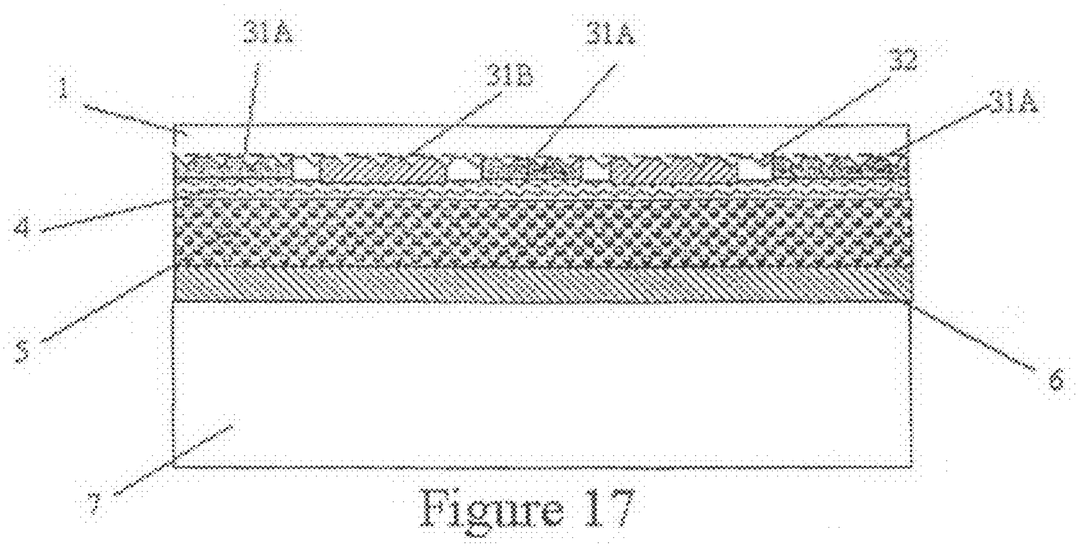
Figure 18:
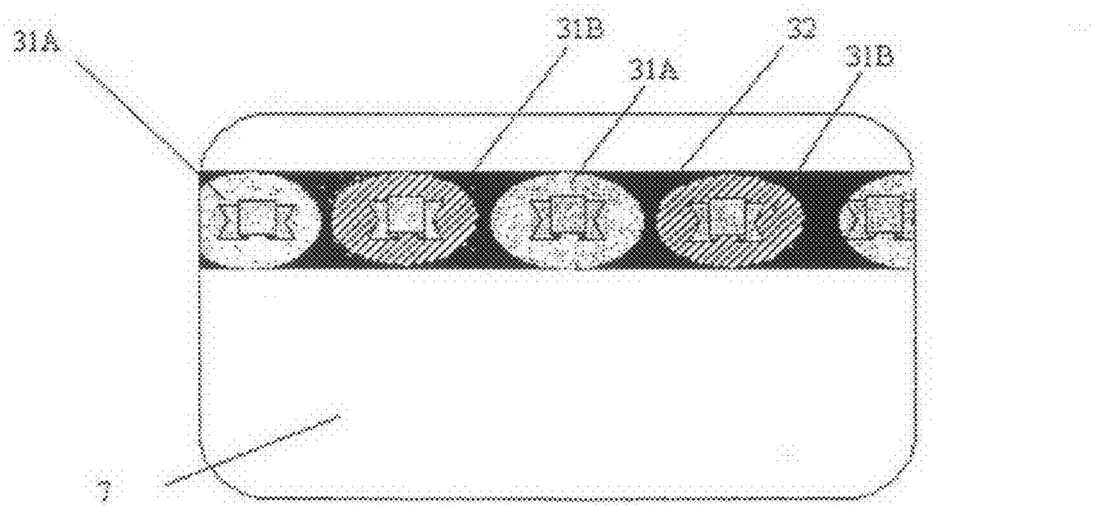

FIGS. 17 and 18 show an enhancement to the Examples already described. Here rather than using a single metal enhancing layer two different coloured metal enhancing layers 31A, 31B are used. For example metal 31A can be aluminium and metal 31B can be copper. Obviously other combinations of metal or metal alloys can be used. It is still necessary to provide a non-conductive path in the previous Examples. The constructions illustrated in FIGS. 17 and 18 provide a significant enhance of the product both in security and aesthetic terms.

The invention claimed is:

1. An optically variable magnetic stripe assembly including a magnetic oxide layer, an optically variable effect generating layer over the magnetic oxide layer, and a reflective layer between the magnetic oxide layer and the optically variable effect generating layer, the reflective layer comprising at least one metal portion, the at least one metal portion only partially extending along the full length of the optically variable effect generating layer, wherein an end to end resistance of the stripe assembly is between 10e6 and 10e9 ohms.

2. An assembly according to claim 1, wherein a plurality of reflective portions are provided with discrete breaks between them.

3. An assembly according to claim 2, wherein the discrete breaks are formed by demetallized regions.

4. An assembly according to claim 2, wherein the discrete breaks have lateral dimensions in the range 2-10 mm.

5. An assembly according to claim 2, wherein the discrete breaks have lateral dimensions totaling 5-15 mm.

6. An assembly according to claim 2, wherein the discrete breaks contain a demetallized dot screen constructed so that no metal dot contacts any other metal dot.

7. An assembly according to claim 2, wherein demetallized indicia are defined in one or more of the discrete breaks, no indicium touching another indicium.

8. An assembly according to claim 7, wherein the indicia are too small to be visible to the naked eye.

9. An assembly according to claim 1, wherein discrete breaks are provided between the at least one metal portion and the edges of the assembly.

10. An assembly according to claim 1, further comprising an electrically non-conductive reflective layer.

11. An assembly according to claim 10, wherein the electrically non-conductive layer is in contact with the metal reflective layer.

12. An assembly according to claim 11, wherein the electrically non-conductive layer has an optical index of refraction of at least 2.0.

13. An assembly according to claim 10, wherein the electrically non-conductive reflective layer is a high refractive index material consisting of TiO2, ZnS or ZrO2.

14. An assembly according to claim 1, wherein the reflective layer is defined by more than one metal, of different colours.

15. An assembly according to claim 1, wherein the at least one metal portion is chosen from aluminum and copper or alloys thereof.

16. An assembly according to claim 1, wherein the optically variable effect generating layer comprises a lacquer provided with a surface relief.

17. A security document provided with an optically variable magnetic stripe assembly according to claim 1.

18. A security document according to claim 17, the security document comprising a payment or identity document.

19. A security document according to claim 18, wherein the payment or identity document includes a credit card, debit card, cheque card, ticket, savings book or bank note.

20. An assembly according to claim 1, wherein the reflective layer is a uniformly discontinuous metal layer.

21. An assembly according to claim 20, wherein the metal layer comprises a regular matrix of dots.

22. An assembly according to claim 21, wherein the dots have diameters in the range 50-150 um.

23. An assembly according to claim 1, further comprising a wherein the reflective layer is a discontinuous metal reflective layer between the magnetic oxide layer and the optically variable effect generating layer, and a static resistive layer positioned to enable a static charge to be dissipated in a controlled manner.

24. An assembly according to claim 1, wherein the end to end resistance of the stripe assembly is about 5×10e8 ohms.

* * * * *